United States Patent
Locklear et al.

(10) Patent No.: US 12,360,300 B2
(45) Date of Patent: Jul. 15, 2025

(54) DETACHABLE ULTRAVIOLET (UV) PROTECTOR SHIELD FOR OUTDOOR USE AND METHOD OF USING SAME

(71) Applicant: Air Production & Services Inc., Pembroke, NC (US)

(72) Inventors: Kiel L. Locklear, Pembroke, NC (US); Charles Gilliam, Ellerbe, NC (US); Joseph Strickland, Rowland, NC (US)

(73) Assignee: Air Production & Services Inc., Pembroke, NC (US)

( * ) Notice: Subject to any disclaimer, the term of this patent is extended or adjusted under 35 U.S.C. 154(b) by 751 days.

(21) Appl. No.: 17/400,808

(22) Filed: Aug. 12, 2021

(65) Prior Publication Data
US 2022/0057555 A1    Feb. 24, 2022

Related U.S. Application Data

(60) Provisional application No. 63/067,029, filed on Aug. 18, 2020.

(51) Int. Cl.
*G02B 5/20* (2006.01)
*G02B 1/04* (2006.01)
*G02B 7/00* (2021.01)

(52) U.S. Cl.
CPC .............. *G02B 5/208* (2013.01); *G02B 1/04* (2013.01); *G02B 7/006* (2013.01)

(58) Field of Classification Search
CPC .......... G02B 5/208; G02B 5/22; G02B 5/223; G02B 5/226; G02B 5/283; G02B 1/04; G02B 7/006; H05K 5/03
See application file for complete search history.

(56) References Cited

U.S. PATENT DOCUMENTS

| | | | |
|---|---|---|---|
| 2007/0184691 A1* | 8/2007 | Perkins | H05K 5/03 439/135 |
| 2008/0032101 A1* | 2/2008 | Reilly | B32B 27/08 428/339 |
| 2014/0363683 A1* | 12/2014 | Sherwood | C08K 5/132 106/287.11 |
| 2019/0048649 A1* | 2/2019 | Koenitz | E06B 1/32 |

OTHER PUBLICATIONS

Safety Technology International, Inc., Product Catalog, copywrite 2013 (Year: 2013).*
Safety Technology International, Inc, "Bio Protectors/Snooper Stopper Product Overview", https://cdn.sanity.io/files/4ikv42xc/production/eb58285adec596c807dea153d46635a3f0ee6ea1.pdf, Feb. 2022, accessed Oct. 7, 2024 (Year: 2022).*

* cited by examiner

*Primary Examiner* — Stephone B Allen
*Assistant Examiner* — Adam W Booher
(74) *Attorney, Agent, or Firm* — Ward and Smith, P.A.; Ryan K. Simmons

(57) ABSTRACT

A detachable ultraviolet (UV) protector shield. In one embodiment, the detachable UV protector shield device may include a housing configured to at least partially cover a controller display. The housing may include a front face rim; a backplate, wherein at least a portion of the backplate is spaced a distance apart from the front face rim; and one or more walls about at least a portion of a periphery of and disposed between at least a portion of the front face rim and at least a portion of the backplate. The detachable UV protector shield device may further include a UV protection panel attached to the front face rim.

20 Claims, 19 Drawing Sheets

DETACHABLE ULTRAVIOLET (UV) PROTECTOR SHIELD FOR OUTDOOR USE AND METHOD OF USING SAME

RELATED APPLICATIONS

This application is related and claims priority to U.S. Provisional Patent Application No. 63/067,029, filed on Aug. 18, 2020, the application of which is incorporate herein by reference in its entirety.

TECHNICAL FIELD

The subject matter of the invention relates generally to ultraviolet (UV) protection and more particularly to a detachable ultraviolet (UV) protector shield for outdoor use and method of using same.

BACKGROUND

Over the past several years, the air compressor industry has become digitized. Various parts and systems are now being controlled electronically through digital controllers mounted on the side of the compressor. However, over a period of time, these compressor controllers, which are operating in an outdoor environment, may experience a considerable amount of damage from ultraviolet (UV) rays, dust, and water, as shown for example in FIG. 21, which shows an example of a sun (UV) damaged controller display 10. As a result, the controllers eventually wear out, and can be very expensive to replace. To remedy some of these issues, some compressor manufactures have created an "outdoor package." However, most of these outdoor packages involve creating water-tight seals around the face of the controller and offer very little UV ray protection.

SUMMARY

In one embodiment, a detachable ultraviolet (UV) protector shield device is provided. The detachable UV protector shield device may include a housing configured to at least partially cover a controller display. The housing may include a front face rim; a backplate, wherein at least a portion of the backplate is spaced a distance apart from the front face rim; and one or more walls about at least a portion of a periphery of and disposed between at least a portion of the front face rim and at least a portion of the backplate. The detachable UV protector shield device may further include a UV protection panel attached to the front face rim. The detachable UV protector shield device may further include a releasable attachment mechanism disposed on at least a portion of the backplate, wherein the releasable attachment mechanism may be configured to releasably couple to a surface. The housing may be generally U-shaped. The one or more walls of the housing may include a top wall; a first side wall extending perpendicular from a first side edge of the top wall; a second side wall extending perpendicular from a second opposing side edge of the top wall; and wherein the front face rim may be arranged around a front edge of the top wall, first side wall, and second side wall, and wherein the backplate may be arranged about a back edge of the top wall, first side wall, and second side wall. The releasable attachment mechanism may include a releasable backing layer. The releasable backing layer may include one or more of reusable adhesive, magnetic backing, and hook and loop. The UV protection panel may be configured to at least one of filter, block, and/or absorb UV light. The housing may include a UV-resistant weatherable material. The UV-resistant weatherable material may include Acrylonitrile Styrene Acrylate (ASA) plastic. The UV protection panel may include glass with a UV protection coating. The UV protection panel of the detachable UV protector shield device may be configured to filter, block, or absorb substantially all UV light from striking a surface directly behind the UV protection panel. The releasable attachment mechanism may include one or more releasable mechanical fasteners. The housing may include one of a generally square, diamond, triangular, circular, or ovular shape. The detachable UV protector shield device may include an overall width in the range of about 7 inches to about 24 inches; an overall height in the range of about 5 inches to about 15 inches; an overall width in the range of about 2 inches to about 4 inches, and wherein the UV protection panel is in the range of about 4 inches to about 22 inches wide and in the range of about 3 inches to about 13 inches high.

In another embodiment, a method of using a detachable UV protector shield device is provided. The method may include one or more of providing a detachable UV protector shield device; installing the detachable UV protector shield device such that the UV protection panel covers a desired portion of a device, hardware, and/or component to be protected; removing the detachable UV protector shield device from the desired portion of the device, hardware, and/or component being protected, as needed, during operation or use of the desired portion of the device, hardware, and/or component being protected; and reinstalling the detachable UV protector shield device such that the UV protection panel covers the desired portion of the device, hardware, and/or component to be protected. The detachable UV protector shield device is installed and removed via one or more releasing mechanisms on the backplate. The one or more releasing mechanisms may include one or more of reusable adhesive, magnetic backing, hook and loop and/or one or more releasable mechanical fasteners. The desired portion of a device, hardware, and/or component to be protected may include one or both of a controller and/or display of the device, hardware, and/or component. The UV protection panel may be configured to at least one of filter, block, or absorb UV light from striking the desired portion of a device, hardware, and/or component to be protected.

BRIEF DESCRIPTION OF THE DRAWINGS

Figure 1:
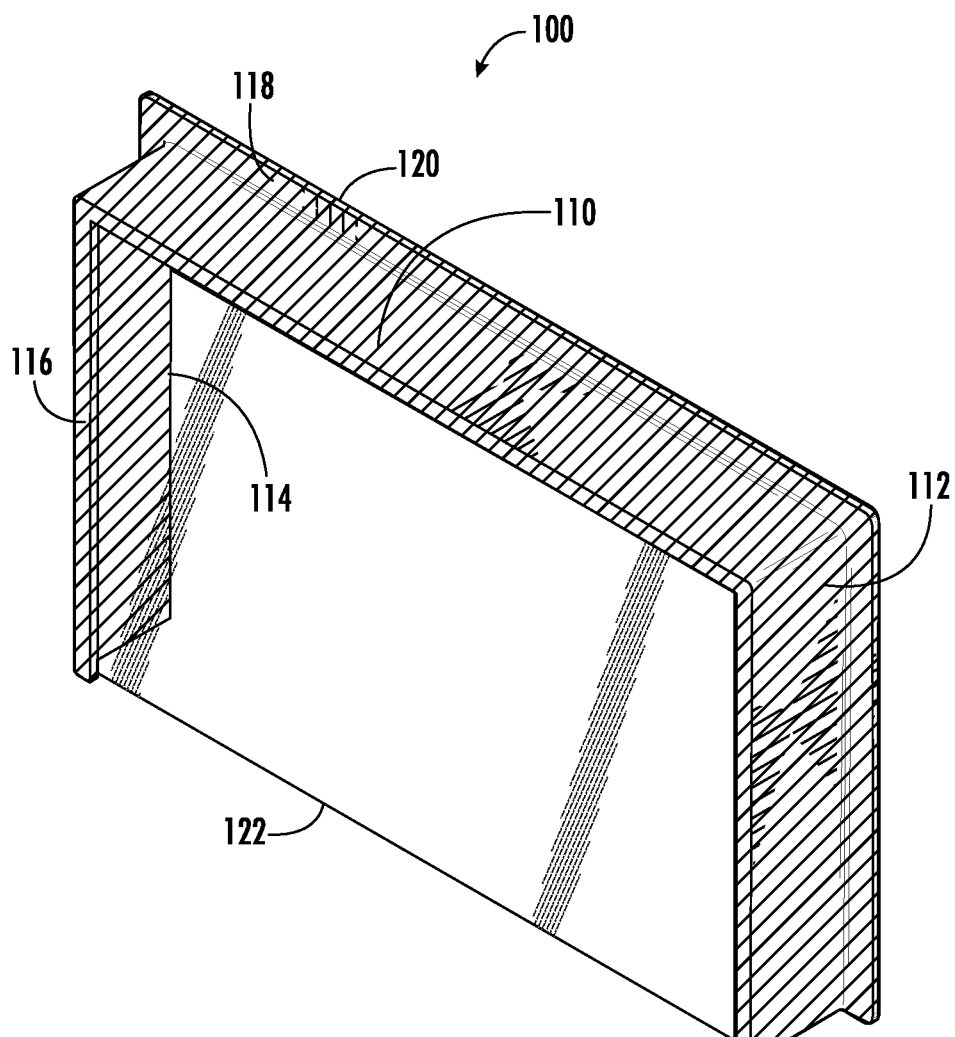
Figure 2:
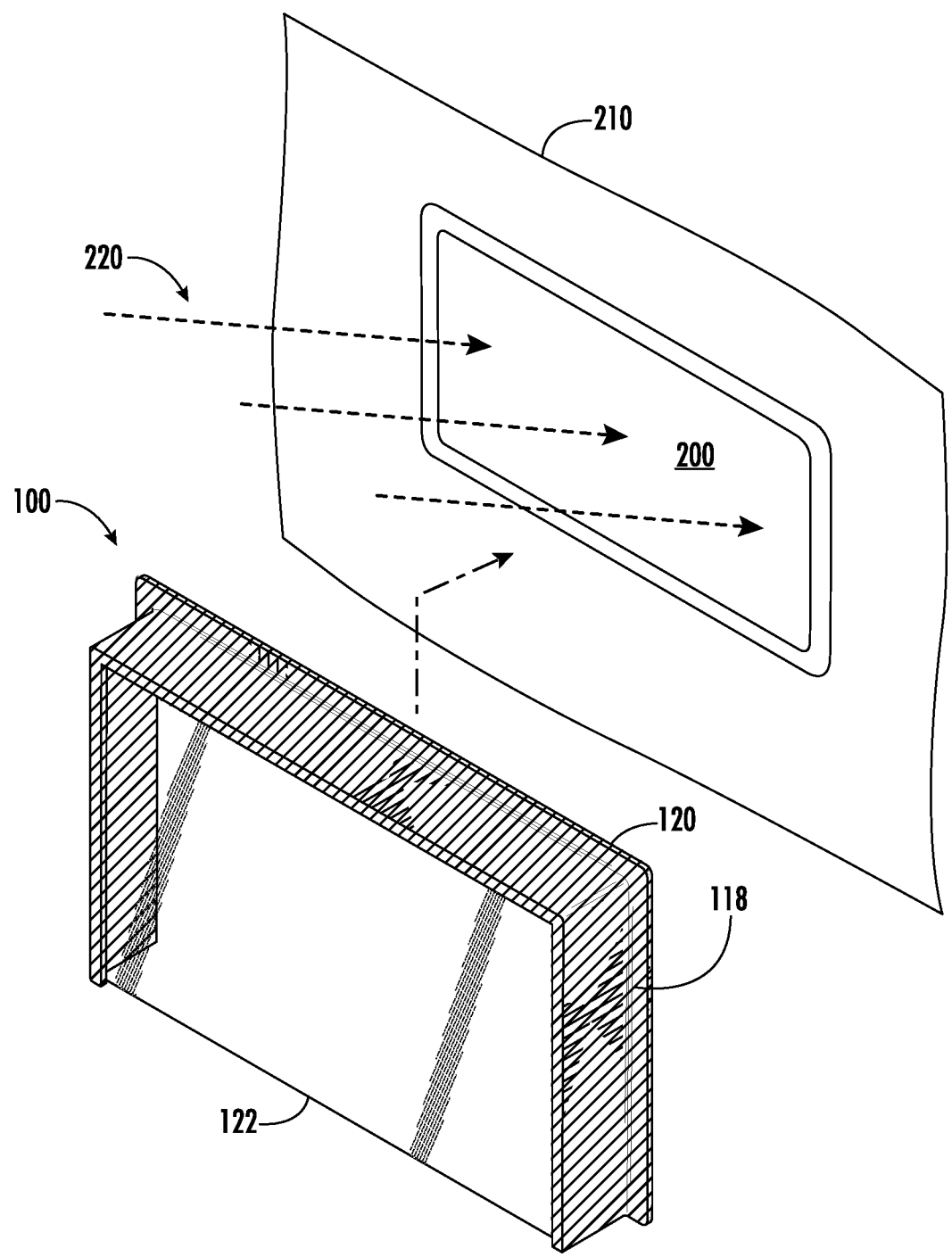
Figure 3:
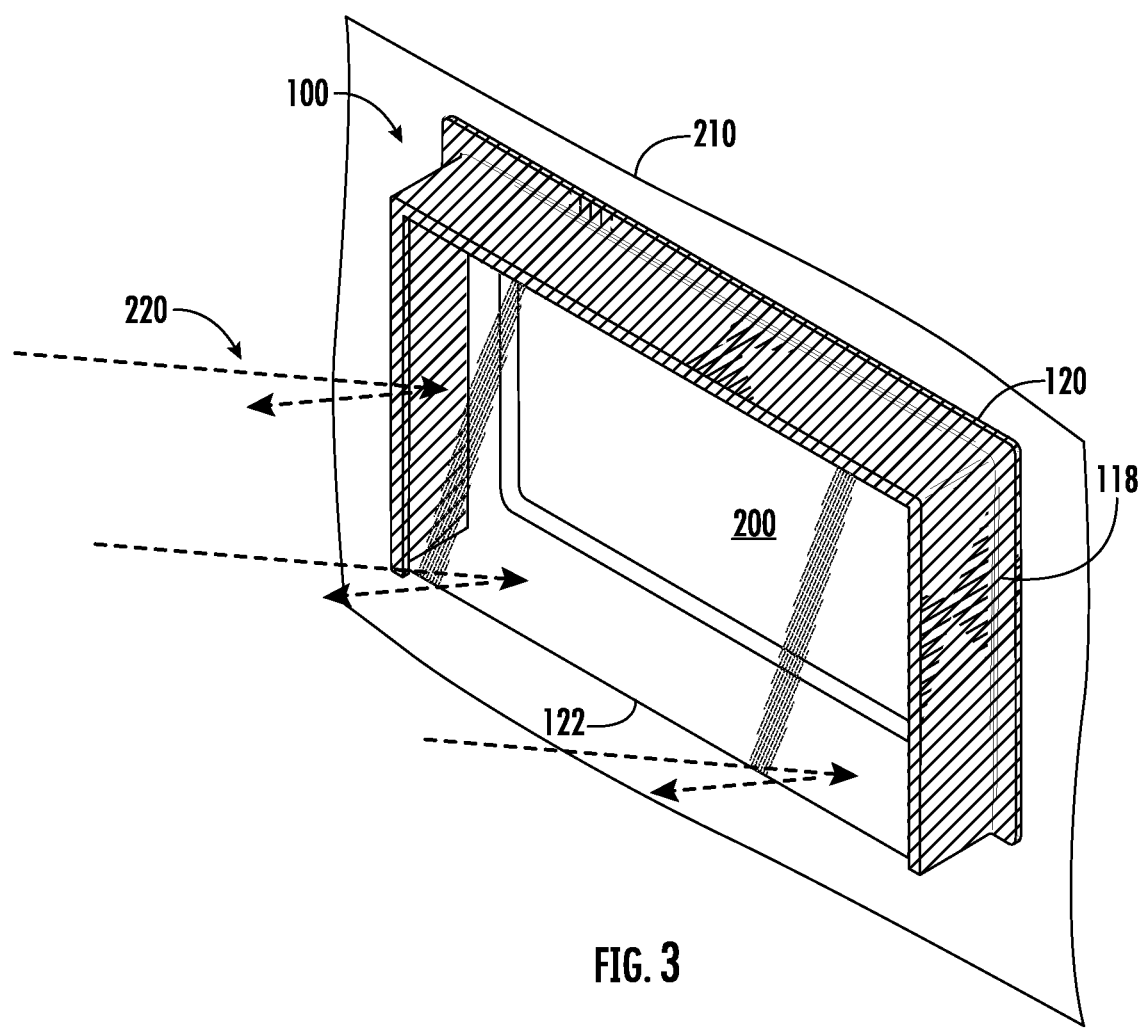
Figure 4:
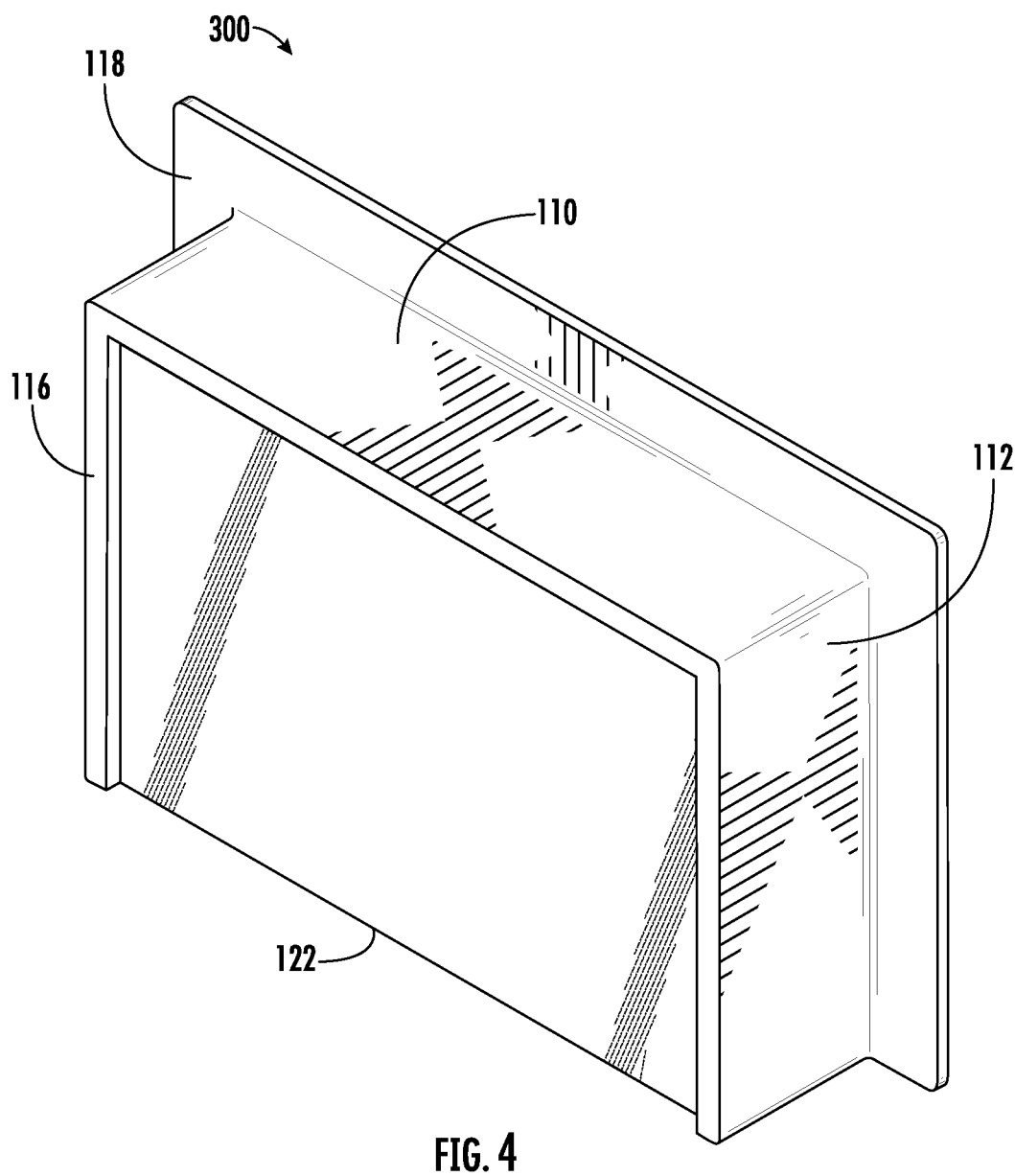
Figure 5:
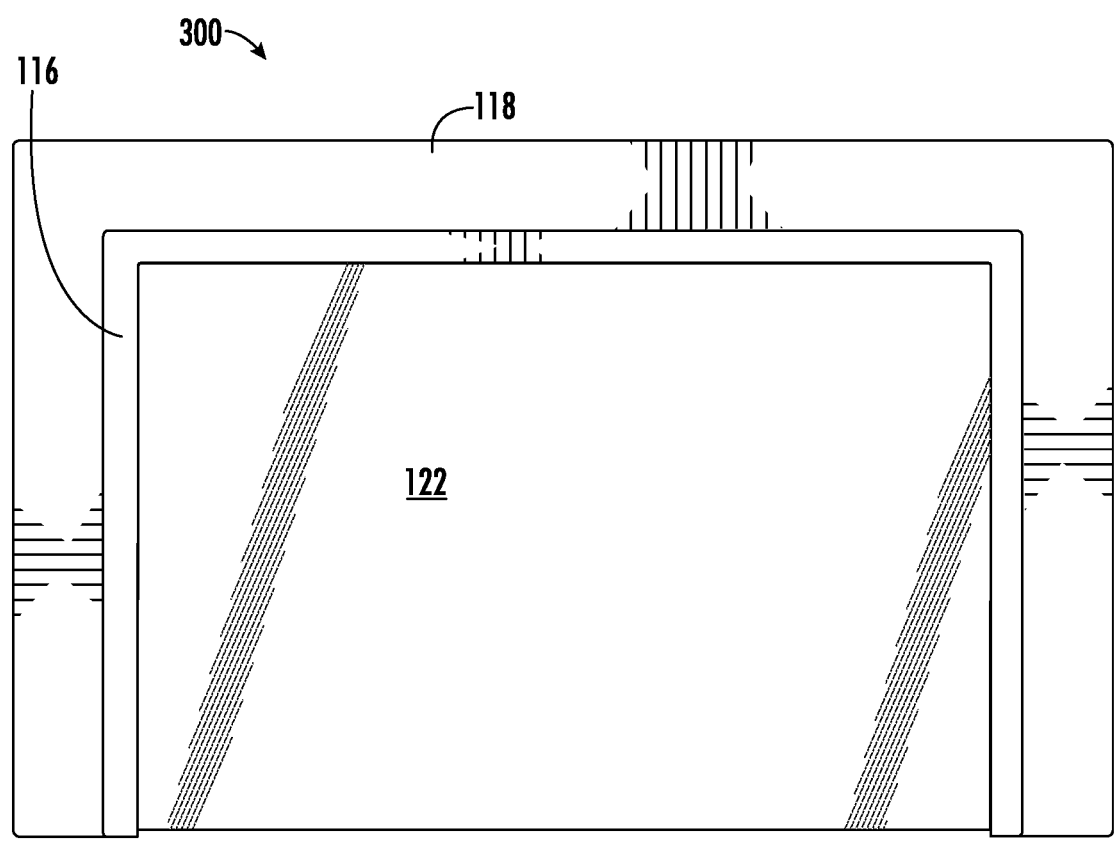
Figure 6:
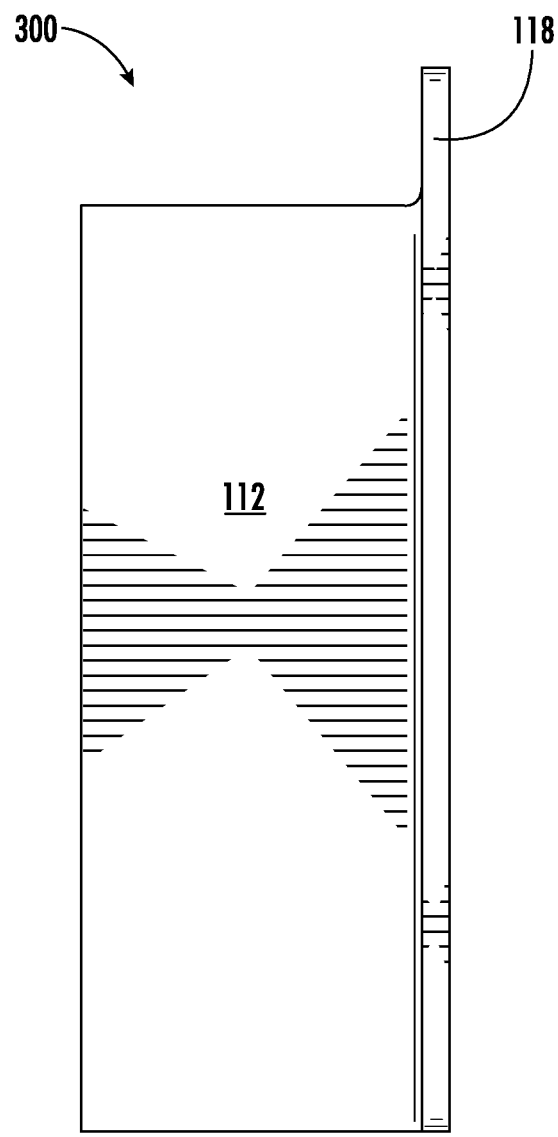
Figure 7:
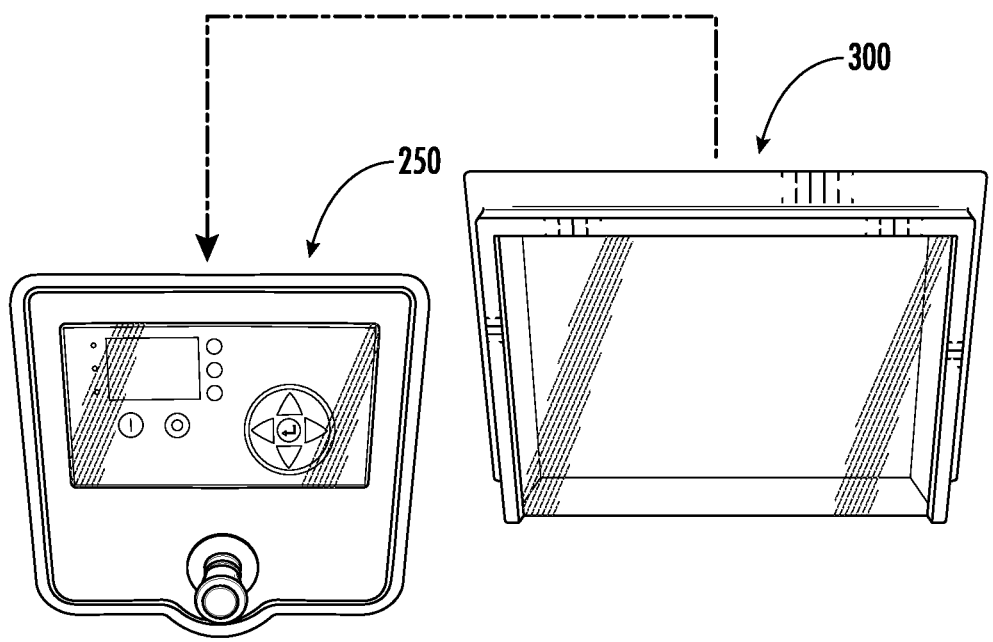
Figure 8:
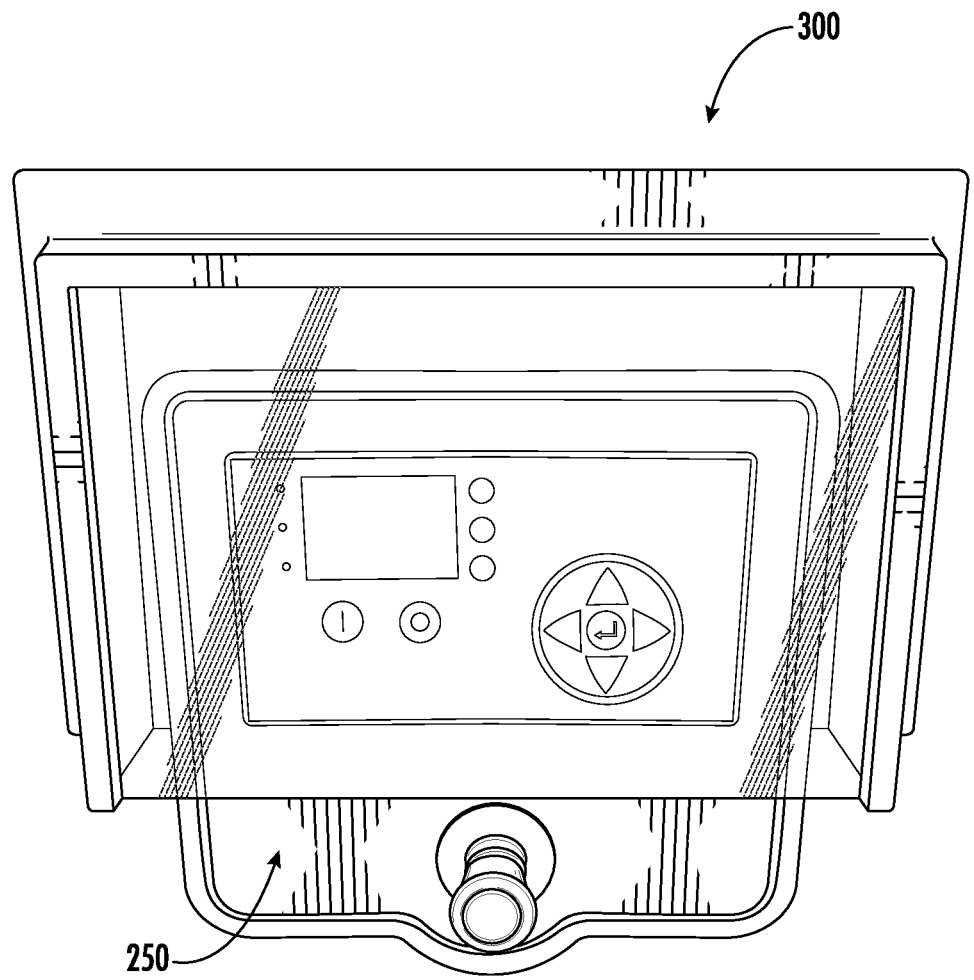
Figure 9:
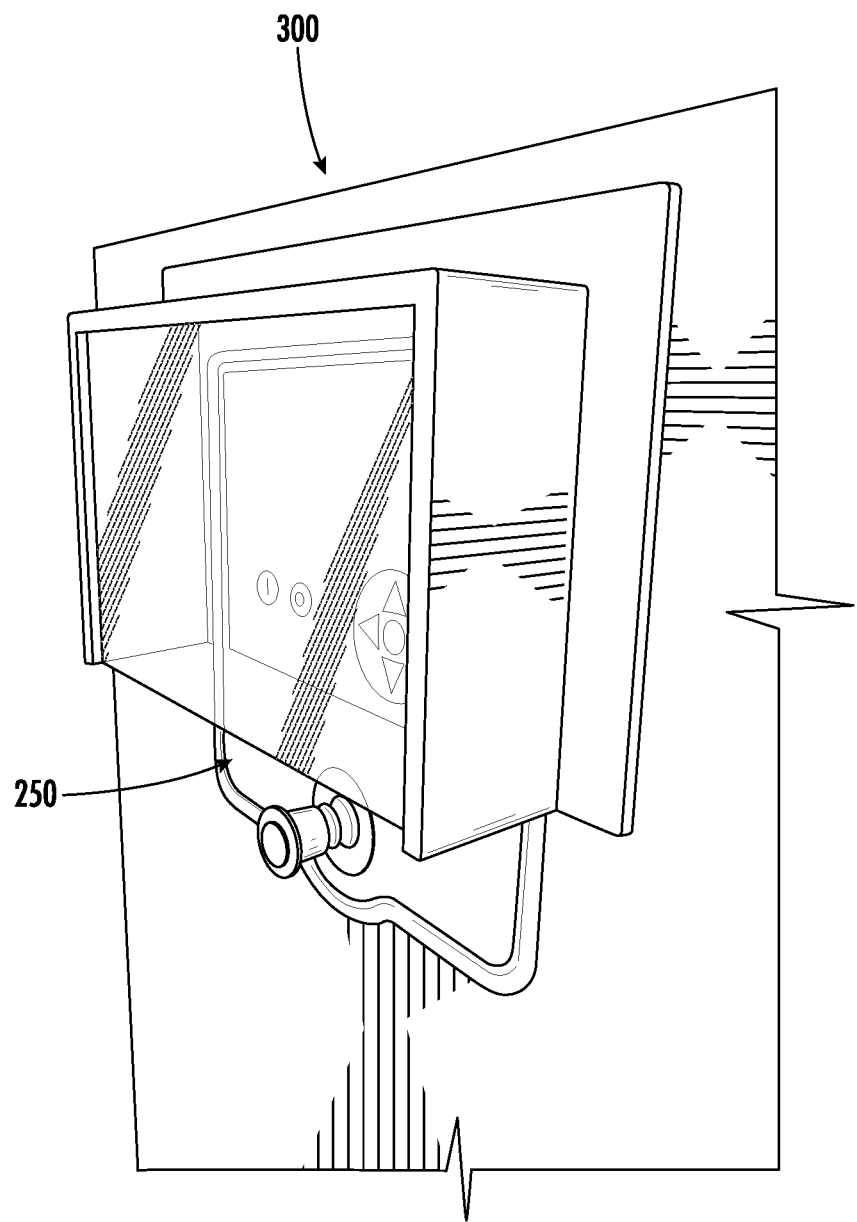
Figure 10:
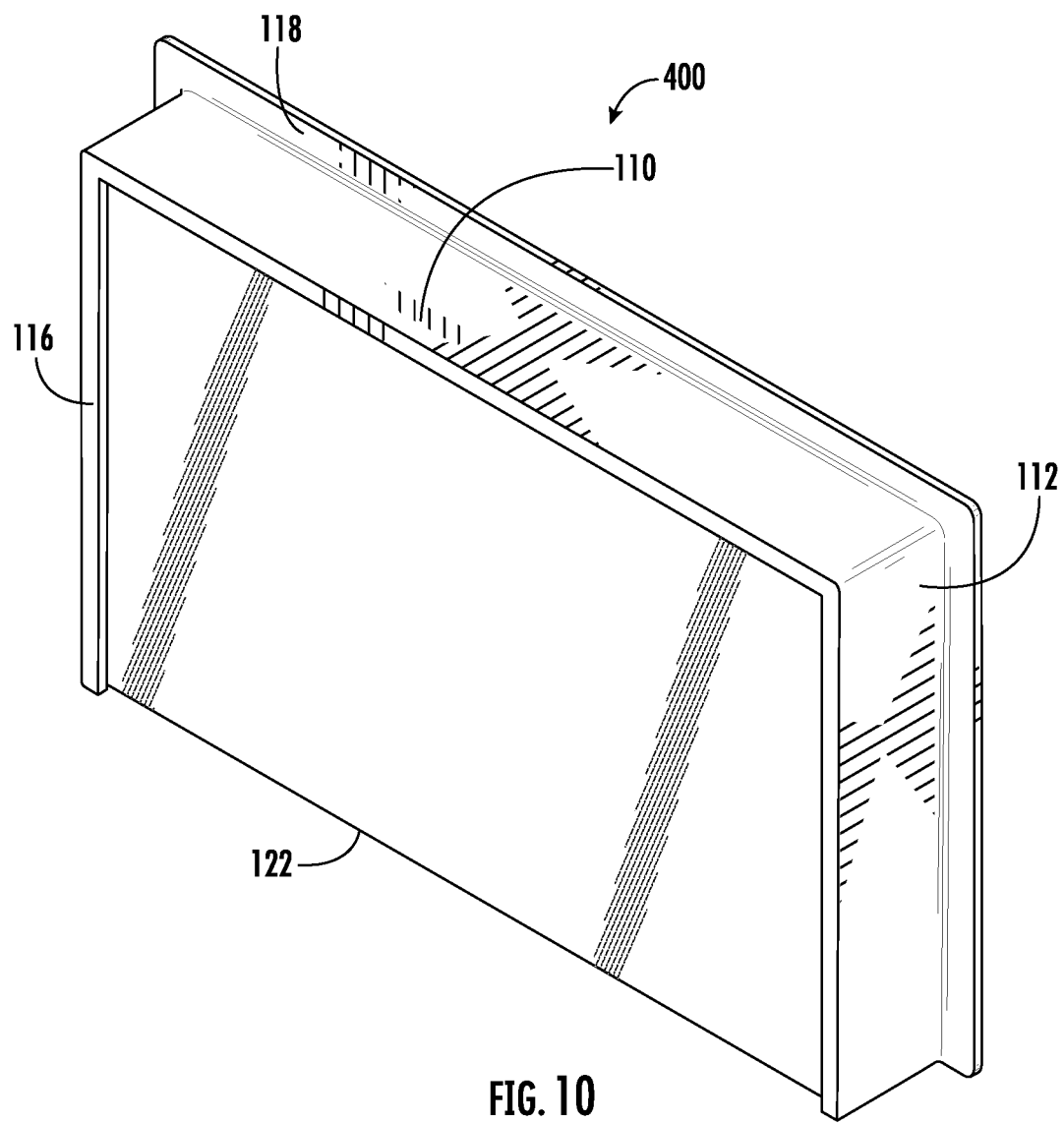
Figure 11:
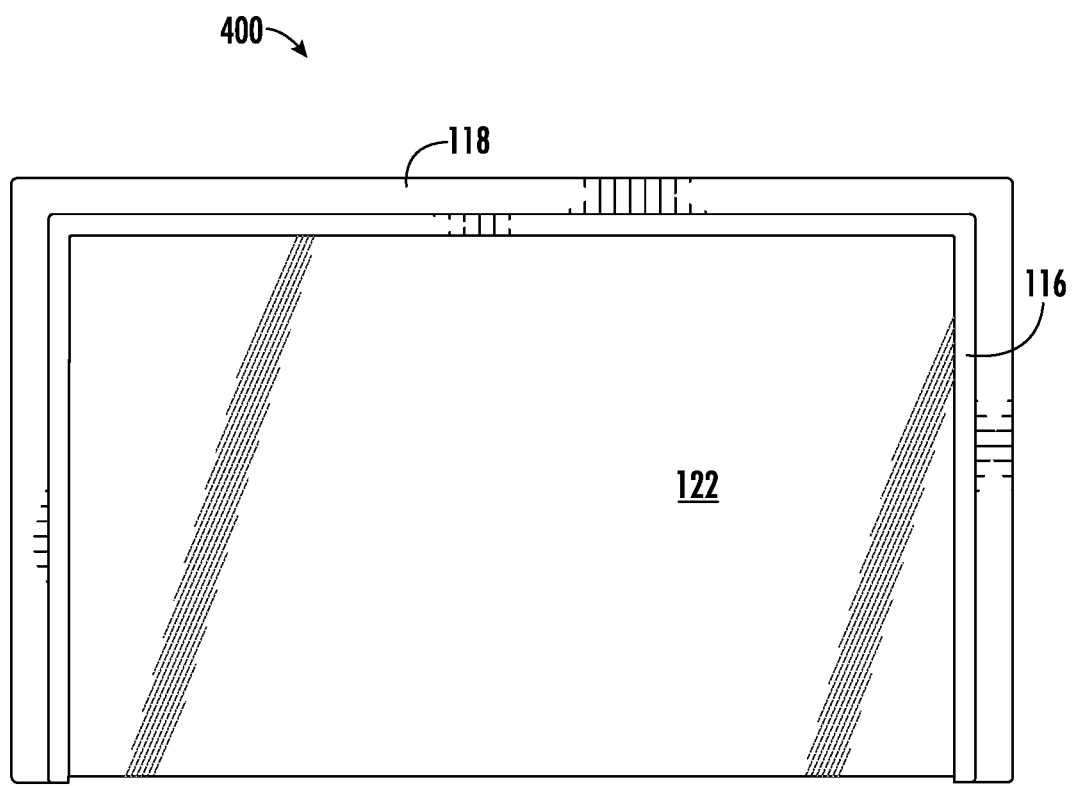
Figure 12:
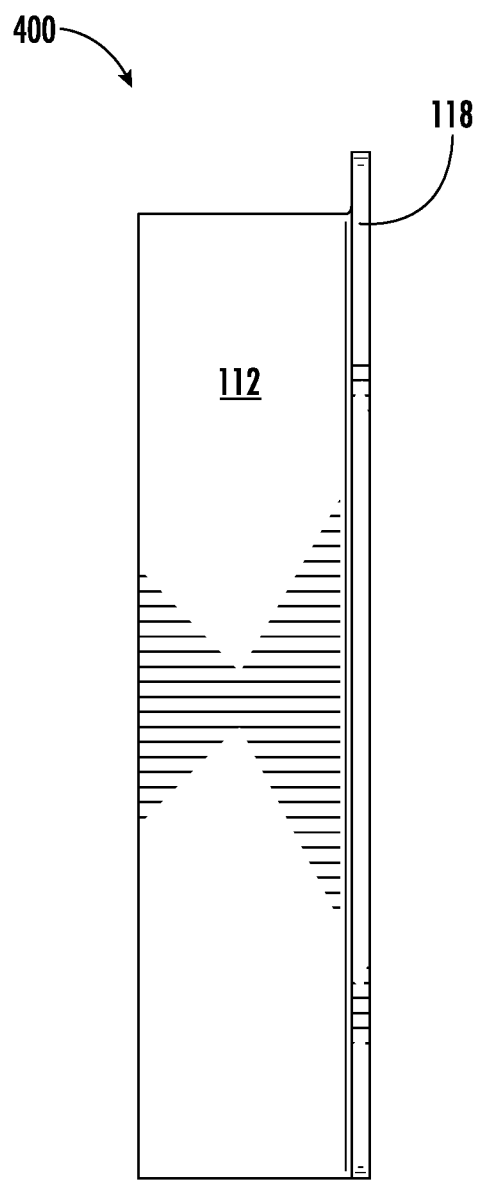
Figure 13:
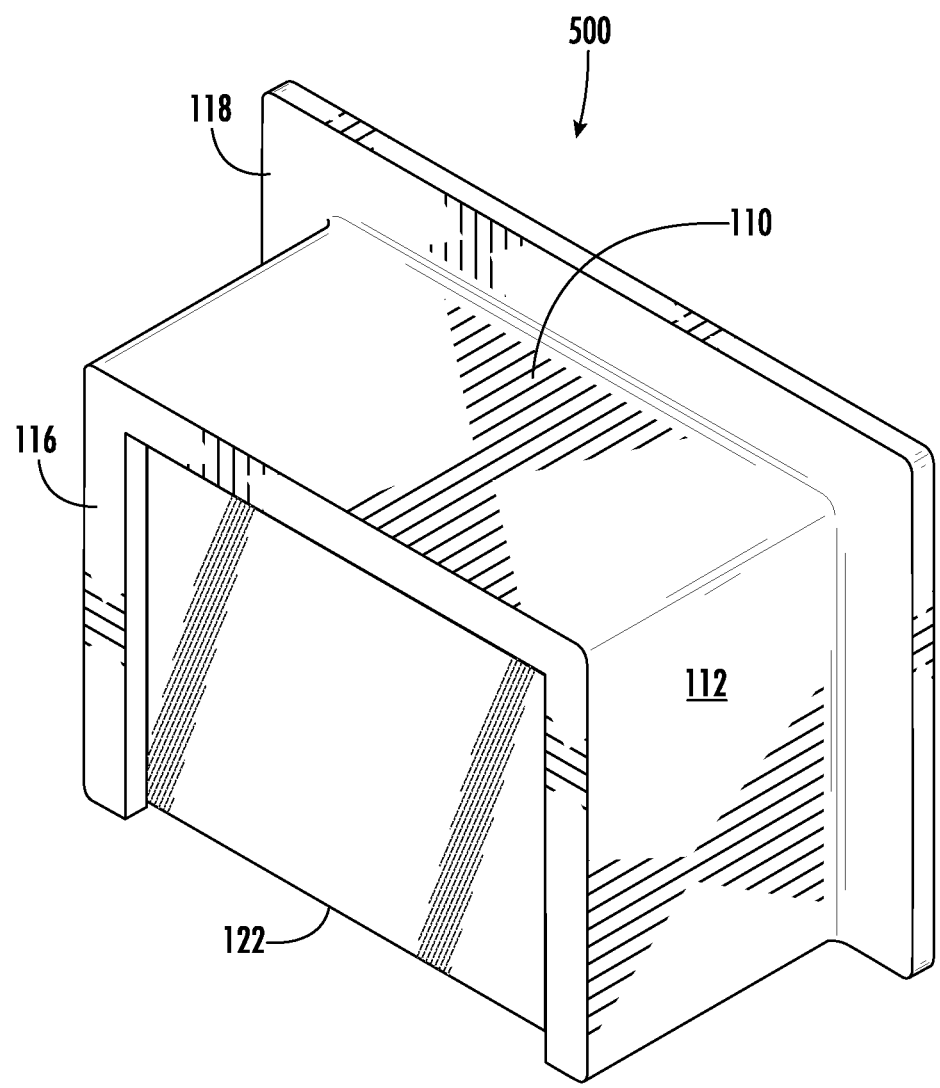
Figure 14:
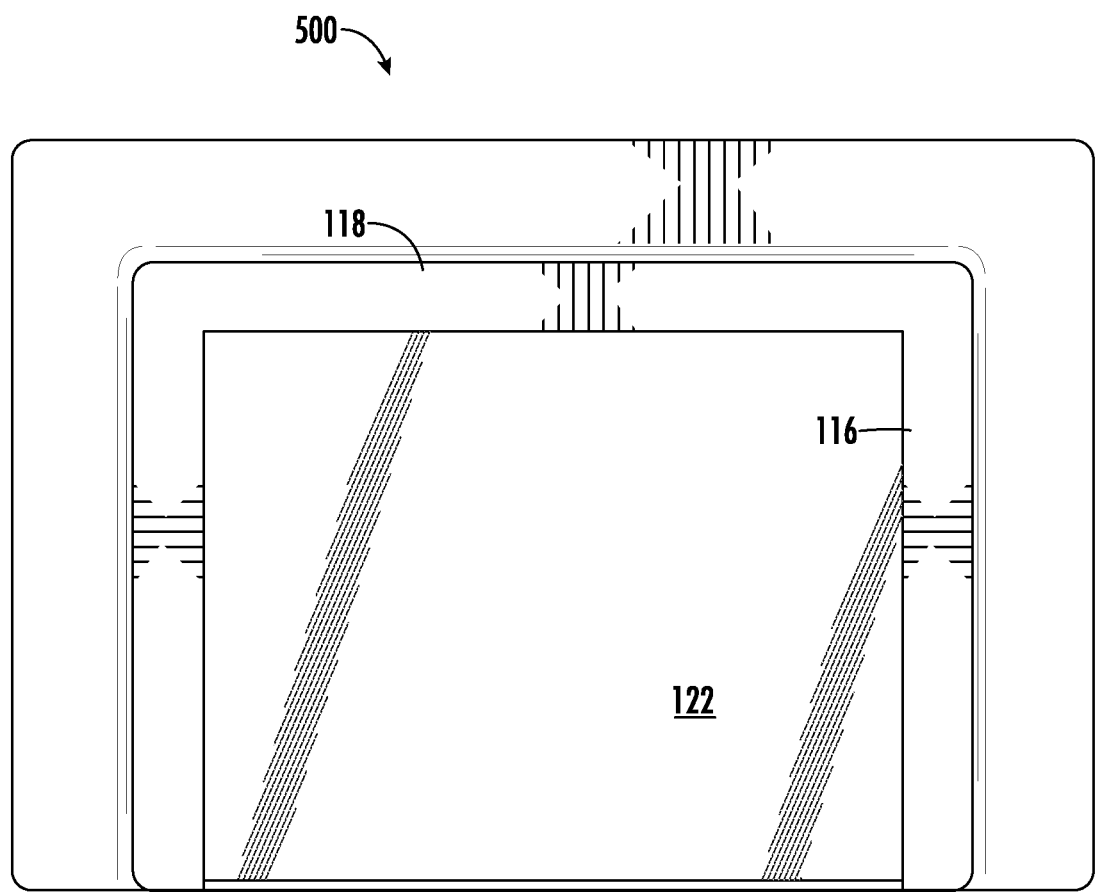
Figure 15:
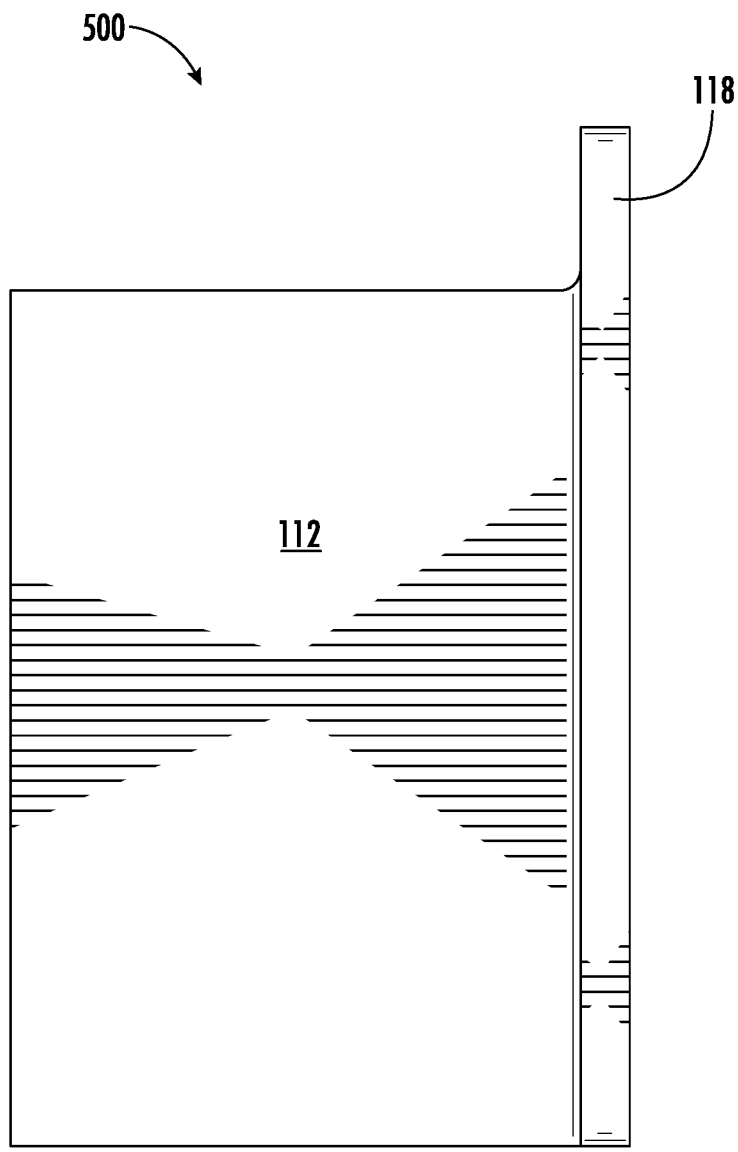
Figure 16:
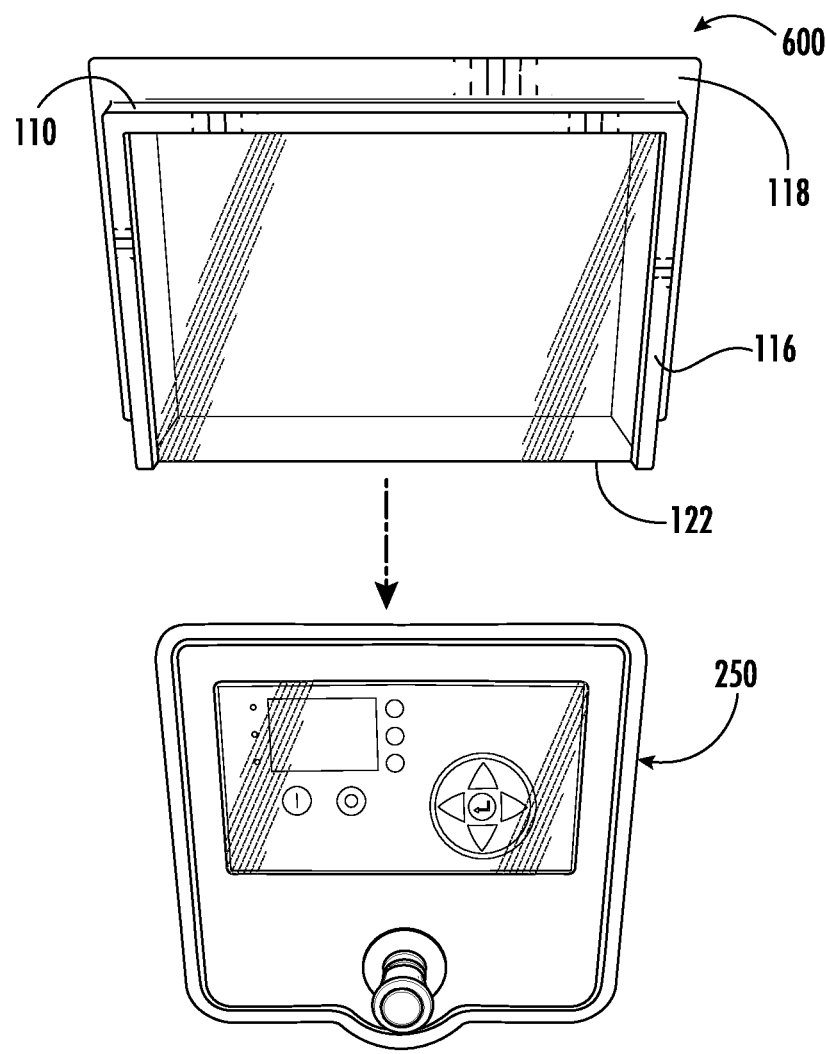
Figure 17:
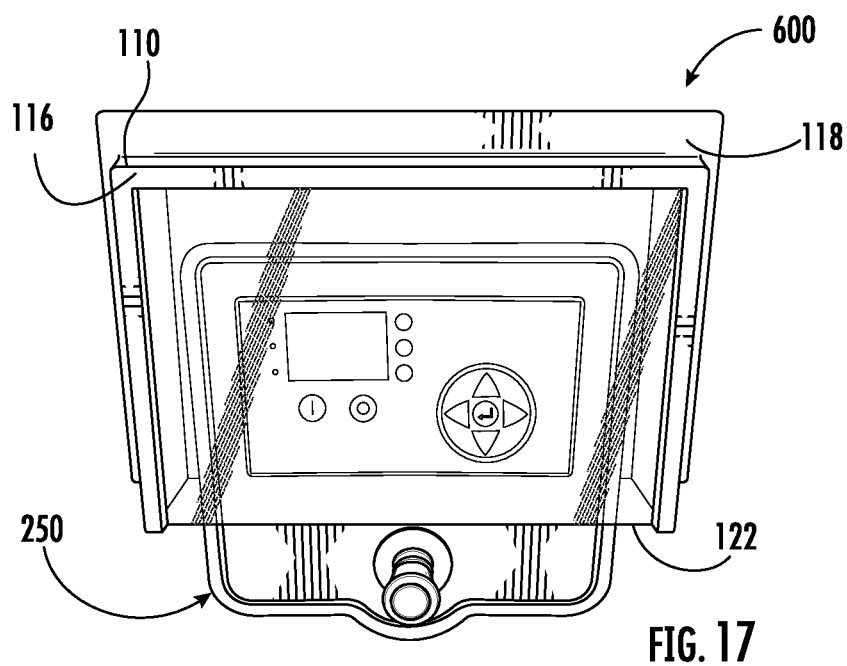
Figure 18:
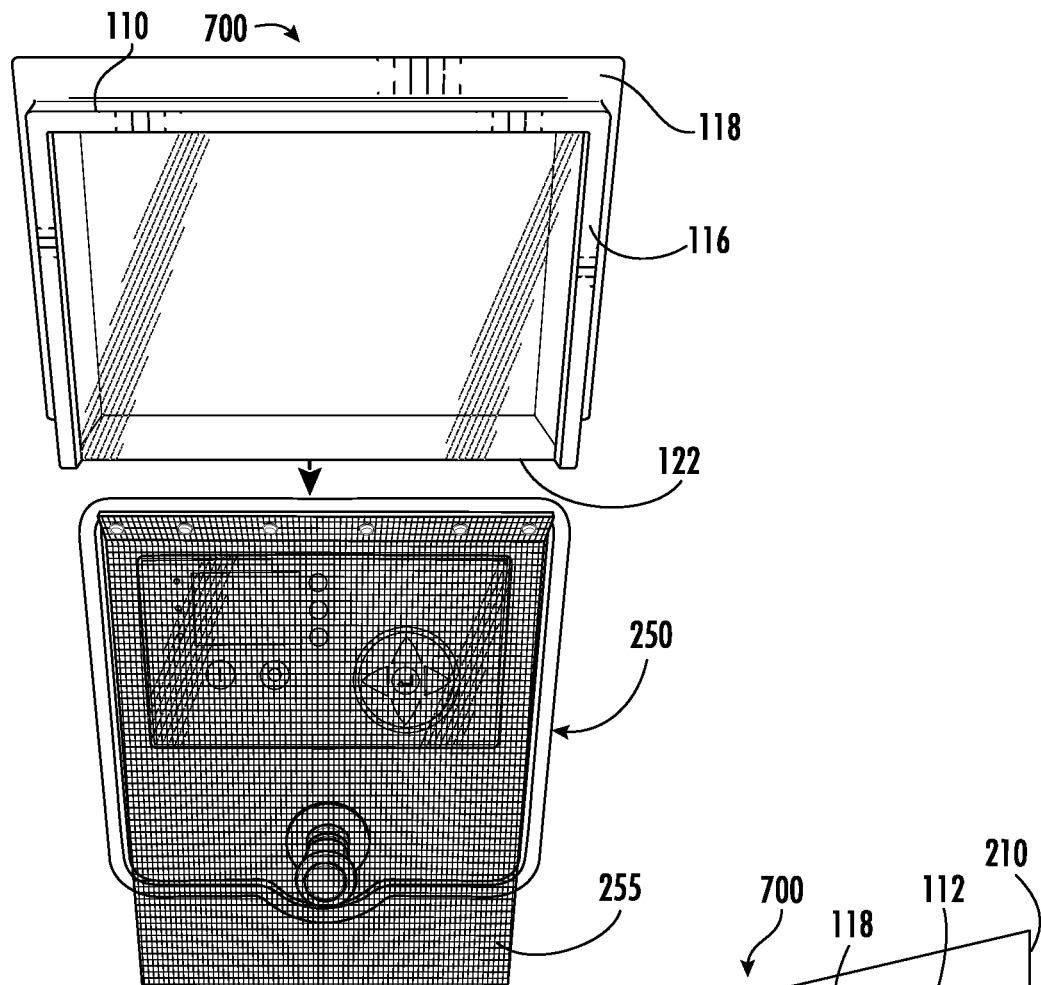
Figure 19:
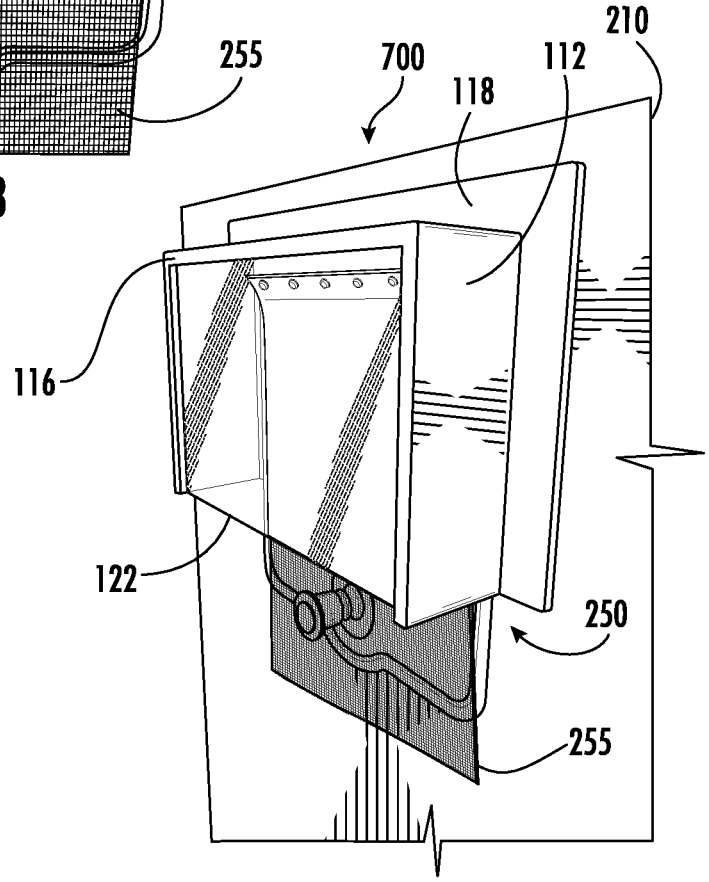
Figure 20:
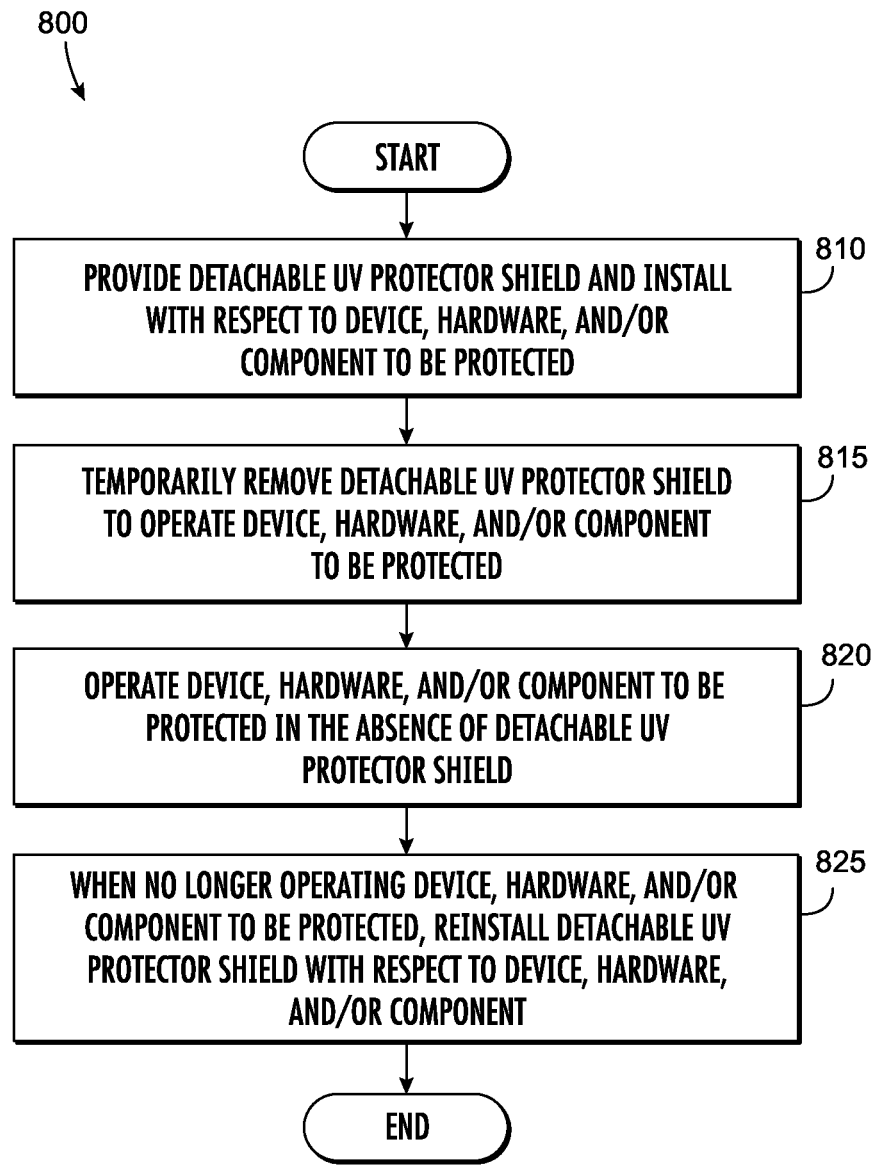
Figure 21:
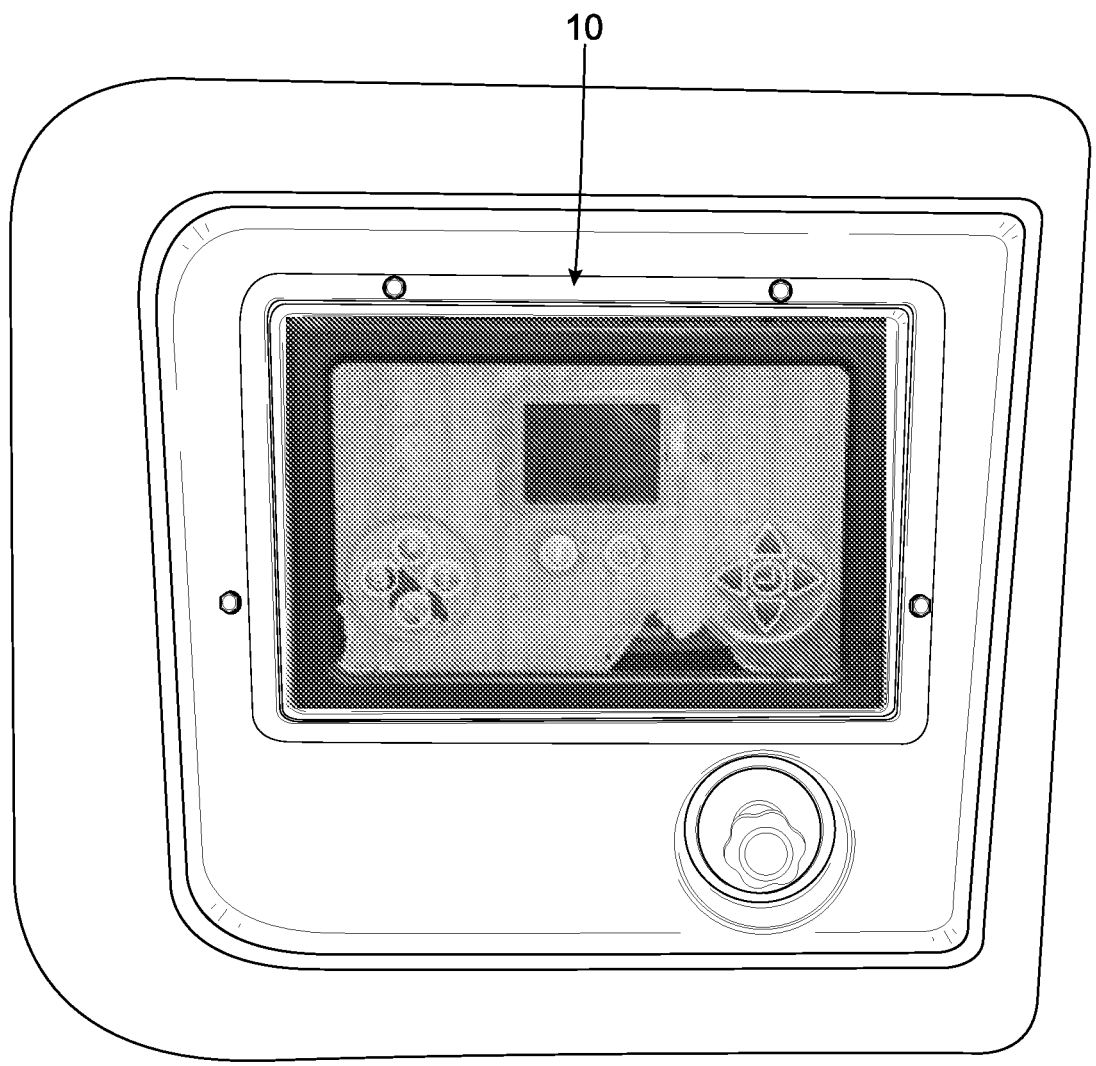

Having thus described the subject matter of the invention in general terms, reference will now be made to the accompanying drawings, which are not necessarily drawn to scale, and wherein:

FIG. 1 illustrates a perspective view of an example of a detachable UV protector shield, in accordance with an embodiment of the invention;

FIG. 2 and FIG. 3 illustrate perspective views showing an example of a process of using the detachable UV protector, in accordance with an embodiment of the invention;

FIG. 4, FIG. 5, and FIG. 6 illustrate a perspective view, a front view, and a side view, respectively, of another example of the detachable UV protector shield, in accordance with an embodiment of the invention;

FIG. 7, FIG. 8, and FIG. 9 illustrate an example of the detachable UV protector shield shown in FIG. 4, FIG. 5, and FIG. 6 with respect to an example controller display, in accordance with an embodiment of the invention;

FIG. 10, FIG. 11, and FIG. 12 illustrate a perspective view, a front view, and a side view, respectively, of yet another example of the detachable UV protector shield, in accordance with an embodiment of the invention;

FIG. 13, FIG. 14, and FIG. 15 illustrate a perspective view, a front view, and a side view, respectively, of still another example of the detachable UV protector shield, in accordance with an embodiment of the invention;

FIG. 16 illustrates an example of a detachable UV protector shield removed from an example controller display, in accordance with an embodiment of the invention;

FIG. 17 illustrates an example of the detachable UV protector shield shown in FIG. 16 installed over the example controller display, in accordance with an embodiment of the invention;

FIG. 18 illustrates another example of a detachable UV protector shield removed from an example controller display, in accordance with an embodiment of the invention;

FIG. 19 illustrates another example of the detachable UV protector shield shown in FIG. 18 installed over the example controller display, in accordance with an embodiment of the invention;

FIG. 20 illustrates a flow diagram of an example of a method of using the detachable UV protector shield, in accordance with an embodiment of the invention; and FIG. 21 illustrates an example of a controller display without a UV protector shield installed that has been damaged by the sun (UV rays).

DETAILED DESCRIPTION

The subject matter of the invention now will be described more fully hereinafter with reference to the accompanying drawings, in which some, but not all embodiments of the subject matter of the invention are shown. Like numbers refer to like elements throughout. The subject matter of the invention may be embodied in many different forms and should not be construed as limited to the embodiments set forth herein; rather, these embodiments are provided so that this disclosure will satisfy applicable legal requirements. Indeed, many modifications and other embodiments of the subject matter of the invention set forth herein will come to mind to one skilled in the art to which the subject matter of the invention pertains having the benefit of the teachings presented in the foregoing descriptions and the associated Drawings. Therefore, it is to be understood that the subject matter of the invention is not to be limited to the specific embodiments disclosed and that modifications and other embodiments are intended to be included within the scope of the appended claims.

In some embodiments, the invention provides a detachable ultraviolet (UV) protector shield for outdoor use and method of using same.

In one example, the detachable UV protector shield for outdoor use and method may be designed to protect the digital display of an air compressor, wherein the air compressor (and display) may be situated outdoors with daily exposure to UV rays. However, this is exemplary only. The detachable UV protector shield for outdoor use and method may be designed to protect any device, hardware, and/or component that may be sensitive to UV light and/or that may be prone to damage from UV light.

In some embodiments, the detachable UV protector shield for outdoor use and method may provide a body or housing that may be shaped and fitted with respect to the device, hardware, and/or component to be protected. In one example, the detachable UV protector shield for outdoor use and method may provide a body or housing that may be generally U-shaped.

In some embodiments, the detachable UV protector shield for outdoor use and method may provide a body or housing that may hold a UV protection panel filling the front face of, for example, a generally U-shaped housing, and wherein the UV protection panel is provided to filter, block, or absorb the UV light.

In some embodiments, the detachable UV protector shield for outdoor use and method may provide a body or housing that may include a housing backplate for coupling to a surface that is around the device, hardware, and/or component to be protected, and wherein the housing backplate may include a mechanism for easily attaching, detaching, and reattaching the detachable UV protector shield to the surface.

In some embodiments, the detachable UV protector shield for outdoor use and method may provide a body or housing that may include a mechanism for easily attaching, detaching, and reattaching the detachable UV protector shield to a surface, and wherein the mechanism may be, for example, a magnetic backing layer, a hook-and-loop system (e.g., VELCRO® Brand), a reusable adhesive layer, mechanical fasteners, and/or any other suitable mechanism or technique.

Referring now to FIG. 1 is a perspective view of an example of a detachable UV protector shield 100 for outdoor use, in accordance with an embodiment of the invention. In this example, detachable UV protector shield 100 may be substantially rectangular shaped for fitting around a substantially rectangular shaped device, hardware, and/or component to be protected, such as, but not limited to, a digital display of a piece of equipment, such as an air compressor, wherein the piece of equipment (and display) may be situated outdoors with daily exposure to UV rays (see FIG. 2 and FIG. 3). However, this is exemplary only. The detachable UV protector shield 100 may be provided in any shape and/or size that substantially corresponds to the shape and/or size of the device, hardware, and/or component to be protected. For example, detachable UV protector shield 100 may be rectangular-shaped, diamond-shaped, triangular-shaped (i.e., any polygonal-shaped), circular-shaped, ovular-shaped, and/or any other suitable shape.

In one example, detachable UV protector shield 100 may include a housing that may be generally U-shaped, and that may include a housing top wall 110, a housing right sidewall 112, and a housing left sidewall 114. Detachable UV protector shield 100 may also include a front face rim 116 arranged around the front of housing top wall 110, housing right sidewall 112, and housing left sidewall 114. Detachable UV protector shield 100 may also include a backplate 118 arranged around the back of housing top wall 110, housing right sidewall 112, and housing left sidewall 114. Further, a backing layer 120 may be provided on the back surface of backplate 118. Backing layer 120 may be the mechanism for easily attaching, detaching, and reattaching detachable UV protector shield 100 to a surface. Backing layer 120 on backplate 118 may be, for example, a magnetic backing layer, a hook-and-loop system (e.g., VELCRO® Brand), a reusable adhesive layer, and/or any other suitable mechanism or technique.

In one non-limiting example, the main housing or body of detachable UV protector shield 100 may be manufactured via a 3D printing process using, for example, Acrylonitrile Styrene Acrylate (ASA) plastic, or other suitable material. ASA plastic is a lightweight, acrylic-based plastic. Further, ASA plastic is a UV-resistant weatherable polymer that has the ability to handle constant UV rays/outdoor weather. In addition to 3D printing, the main housing or body of detachable UV protector shield 100 may be manufactured via any other suitable process and/or technique.

Additionally, detachable UV protector shield 100 may include a UV protection panel 122 installed with respect to front face rim 116. In one non-limiting example, UV protection panel 122 may be glued inside front face rim 116 of detachable UV protector shield 100 using a durable two-part epoxy mixture and/or any other suitable adhesive. UV protection panel 122 is provided to either filter, block, or absorb UV light. UV protection panel 122 may be, in one non-limiting example, glass with a UV protection coating. More specifically, UV protection panel 122 may be tinted acrylic glass. UV protection panel 122 may be made of any other suitable material.

In one example, and referring now to FIG. 2 and FIG. 3, detachable UV protector shield 100 may be a controller cover that is provided "out-of-the-box ready" to install. For example, detachable UV protector shield 100 may attach to the surface of a body panel 210 that is holding a display 200 (e.g., a compressor controller display). In one example, body panel 210 may be a metal body panel and backing layer 120 of detachable UV protector shield 100 may be a magnetic backing layer. Accordingly, detachable UV protector shield 100 may be magnetically coupled and sealed to body panel 210 and positioned to protect display 200, as shown in FIG. 2 and FIG. 3. Namely, when installed, UV protection panel 122 of detachable UV protector shield 100 is positioned in front of display 200 and provides UV protection by either filtering, blocking, or absorbing the UV light. For example, FIG. 2 shows some amount of UV light 220 striking display 200 in the absence of detachable UV protector shield 100. By contrast, FIG. 3 shows that UV light 220 is blocked from striking display 200 by the presence of detachable UV protector shield 100.

In operation, when a user needs to access display 200, the user may easily remove detachable UV protector shield 100 from body panel 210 by pulling it off and setting it aside. Then, the user operates display 200. Then, when operations are completed, the user may easily reinstall detachable UV protector shield 100 onto the body panel 210 via the backing layer 120. In other examples, backing layer 120 may be omitted from detachable UV protector shield 100 and mechanical fasteners (e.g., screws, thumbscrews, clips, brackets, etc.) may be used to fasten detachable UV protector shield 100 to body panel 210.

Referring now to FIG. 4, FIG. 5, and FIG. 6 is a perspective view, a front view, and a side view, respectively, of a detachable UV protector shield 300, which is another example of the detachable UV protector shield. In this non-limiting example, detachable UV protector shield 300 may have a generally rectangular shape that substantially corresponds to a device controller, such as an air compressor controller (e.g., the Xe-70M Series Rotary Controller available from Ingersoll Rand). In this example, detachable UV protector shield 300 may have an overall width in the range of about 14 to about 16 inches (e.g., about 15 inches), an overall height in the range of about 8.5 to about 10.5 inches (e.g., about 9.5 inches), and an overall thickness in the range of about 2 to about 4 inches (e.g., about 3 inches). Further, UV protection panel 122 may be in the range of about 10.5 to about 12.5 inches wide (e.g., about 11.625 inches wide) and in the range of about 6.5 to about 8.5 inches high (e.g., about 7.6875 inches high).

Referring now to FIG. 7, FIG. 8, and FIG. 9 are additional illustrations of detachable UV protector shield 300 shown in FIG. 4, FIG. 5, and FIG. 6 with respect to a controller display 250, showing the detachable UV protector shield 300 in an uninstalled (as shown in FIG. 7) and installed positions (as shown in FIGS. 8 and 9).

Referring now to FIG. 10, FIG. 11, and FIG. 12 is a perspective view, a front view, and a side view, respectively, of a detachable UV protector shield 400, which is yet another example of the detachable UV protector shield for outdoor use. In this non-limiting example, detachable UV protector shield 400 has a generally rectangular shape that substantially corresponds to a device controller, such as an air compressor controller e.g., the Xe-90M Series Rotary Controller available from Ingersoll Rand). In this example, detachable UV protector shield 400 may have an overall width in the range of about 22.75 to about 24.75 inches (e.g., about 23.75 inches), an overall height in the range of about 13.5 to about 15.5 inches (e.g., about 14.375 inches), and an overall thickness of in the range of about 2 to about 4 inches (about 3 inches). Further, UV protection panel 122 may be in the range of about 20 to about 22 inches wide (about 21 inches wide) and in the range of about 12 to about 14 inches high (e.g., about 13 inches high).

Referring now to FIG. 13, FIG. 14, and FIG. 15 is a perspective view, a front view, and a side view, respectively, of a detachable UV protector shield 500, which is still another example of the detachable UV protector shield. In this non-limiting example, detachable UV protector shield 500 has a generally rectangular shape that substantially corresponds to device controller, such as an air compressor controller, e.g., the Anest Iwata Scroll Compressor Controller available from ANEST IWATA USA, Inc. In this example, detachable UV protector shield 500 may have an overall width in the range of about 6.7 to about 8.75 inches (e.g., 7.75 inches), an overall height in the range of about 4.5 to about 6.5 inches (e.g., about 5.375 inches), and an overall thickness in the range of about 2 to 4 inches (e.g., about 3 inches). Further, UV protection panel 122 may be in the range of about 4 to 6 inches wide (e.g., about 5 inches wide) and in the range of about 3 to about 4 inches high (e.g., about 4 inches high).

Referring now to FIG. 16 and FIG. 17 show a detachable UV protector shield 600, which is still another example of the detachable UV protector shield, shown with respect to a controller display 250, showing the detachable UV protector shield 600 in an uninstalled position (as shown in FIG. 16) and an installed position (as shown in FIG. 17).

Referring now to FIG. 18 and FIG. 19 show a detachable UV protector shield 700, which is still yet another example of the detachable UV protector shield, shown with respect to a controller display 250 the controller display 250 having a screen 255 installed thereon, and showing the detachable UV protector shield 700 in an uninstalled position (as shown in FIG. 18) and an installed position (as shown in FIG. 19).

Referring now again to FIG. 1 through FIG. 19, detachable UV protector shields 100, 300, 400, 500, 600, and 700 may be substantially rectangular shaped for fitting around a substantially rectangular shaped device, hardware, and/or component to be protected, such as, but not limited to, a digital display of a compressor. However, detachable UV protector shields 100, 300, 400, 500, 600, and 700 are exemplary only. The detachable UV protector shields may be provided in any shape and/or size that substantially corresponds to the shape and/or size of the device, hardware, and/or component to be protected. For example, the detachable UV protector shields may be rectangular-shaped, diamond-shaped, triangular-shaped (i.e., any polygonal-shaped), circular-shaped, ovular-shaped, and the like.

Referring now to FIG. 20 is a flow diagram of an example of a method 800 of using the detachable UV protector shield (e.g., detachable UV protector shields 100, 300, 400, 500, 600, and 700) for outdoor use. Method 800 may include, but is not limited to, one or more of the following steps, of which the order may vary. At a step 610-810, the detachable UV protector shield may be provided and installed with respect to a device, hardware, and/or component to be protected. For example, one of the detachable UV protector shields 100, 300, 400, and 500 described hereinabove with respect to FIG. 1 through FIG. 15 may be provided. Then, the one of the detachable UV protector shields 100, 300, 400, 500, 600, and 700 may be installed with respect to, for example, display 200, for example, as shown in FIG. 2 and FIG. 3 via backing layer 120 of backplate 118 removably coupling to the body panel 210. In one example, backing layer 120 may be a magnetic backing and body panel 210 may be a metal body panel.

At a step 815, the detachable UV protector shield may be temporarily removed to operate device, hardware, and/or component to be protected. For example, one of the detachable UV protector shields 100, 300, 400, 500, 600, and 700 may be pulled off of the body panel 210 (see FIG. 2 and FIG. 3) via the backing layer 120 of backplate 118 and temporarily set aside. In one example, backing layer 120 may be a magnetic backing and body panel 210 may be a metal body panel, and the one of the detachable UV protector shields 100, 300, 400, 500, 600, and 700 may be pulled off of the metal body panel 210 via the magnetic backing layer 120 of backplate 118.

At a step 820, the device, hardware, and/or component to be protected may be operated in the absence of the detachable UV protector shield. For example, display 200 (see FIG. 2 and FIG. 3) may be operated in the absence of one of the detachable UV protector shields 100, 300, 400, 500, 600, and 700.

At a step 825, when no longer operating device, hardware, and/or component to be protected, the detachable UV protector shield may be reinstalled with respect to device, hardware, and/or component. For example, when no longer operating display 200 (see FIG. 2 and FIG. 3), one of the detachable UV protector shields 100, 300, 400, 500, 600, and 700 may be reinstalled (via backing layer 120 of backplate 118) onto body panel 210 that is holding display 200, which is the device, hardware, and/or component to be protected. In one example, backing layer 120 may be a magnetic backing and body panel 210 may be a metal body panel, and when no longer operating display 200, one of the detachable UV protector shields 100, 300, 400, 500, 600, and 700 may be reinstalled (via the magnetic backing layer 120 of backplate 118) onto the metal body panel 210.

In summary and referring now again to FIG. 1 through FIG. 19, the detachable UV protector shields 100, 300, 400, 500, 600, and 700 and method 800 may be designed to protect any device, hardware, and/or component (e.g., air compressor controller) that may be situated outdoors with daily exposure to UV rays.

In some embodiments, the detachable UV protector shields 100, 300, 400, 500, 600, and 700 and method 800 provide a body or housing that may be shaped and fitted with respect to the device, hardware, and/or component to be protected, such as, but not limited to, a U-shaped body or housing.

In some embodiments, the detachable UV protector shields 100, 300, 400, 500, 600, and 700 and method 800 provide a body or housing that may hold UV protection panel 122 that fills the front face of, for example, a U-shaped housing, and wherein UV protection panel 122 is provided to filter, block, or absorb the UV light.

In some embodiments, the detachable UV protector shields 100, 300, 400, 500, 600, and 700 and method 800 provide a body or housing that may include backplate 118 for coupling to a surface that is around the device, hardware, and/or component to be protected, and wherein backplate 118 may include a backing layer 120 (e.g., a magnetic backing layer, a hook-and-loop system (e.g., VELCRO® Brand), a reusable adhesive layer, mechanical fasteners, and/or the like) that provides a mechanism for easily attaching, detaching, and reattaching the detachable UV protector shields 100, 300, 400, 500, 600, and 700 to a surface.

Following long-standing patent law convention, the terms "a," "an," and "the" refer to "one or more" when used in this application, including the claims. Thus, for example, reference to "a subject" includes a plurality of subjects, unless the context clearly is to the contrary (e.g., a plurality of subjects), and so forth.

Throughout this specification and the claims, the terms "comprise," "comprises," and "comprising" are used in a non-exclusive sense, except where the context requires otherwise. Likewise, the term "include" and its grammatical variants are intended to be non-limiting, such that recitation of items in a list is not to the exclusion of other like items that can be substituted or added to the listed items.

For the purposes of this specification and appended claims, unless otherwise indicated, all numbers expressing amounts, sizes, dimensions, proportions, shapes, formulations, parameters, percentages, quantities, characteristics, and other numerical values used in the specification and claims, are to be understood as being modified in all instances by the term "about" even though the term "about" may not expressly appear with the value, amount or range. Accordingly, unless indicated to the contrary, the numerical parameters set forth in the following specification and attached claims are not and need not be exact, but may be approximate and/or larger or smaller as desired, reflecting tolerances, conversion factors, rounding off, measurement error and the like, and other factors known to those of skill in the art depending on the desired properties sought to be obtained by the subject matter of the invention. For example, the term "about," when referring to a value can be meant to encompass variations of, in some embodiments±100%, in some embodiments±50%, in some embodiments±20%, in some embodiments±10%, in some embodiments±5%, in some embodiments±1%, in some embodiments±0.5%, and in some embodiments±0.1% from the specified amount, as such variations are appropriate to perform the disclosed methods or employ the disclosed compositions.

Further, the term "about" when used in connection with one or more numbers or numerical ranges, should be understood to refer to all such numbers, including all numbers in a range and modifies that range by extending the boundaries above and below the numerical values set forth. The recitation of numerical ranges by endpoints includes all numbers, e.g., whole integers, including fractions thereof, subsumed within that range (for example, the recitation of 1 to 5 includes 1, 2, 3, 4, and 5, as well as fractions thereof, e.g., 1.5, 2.25, 3.75, 4.1, and the like) and any range within that range.

Although the foregoing subject matter has been described in some detail by way of illustration and example for purposes of clarity of understanding, it will be understood by those skilled in the art that certain changes and modifications can be practiced within the scope of the appended claims.

That which is claimed:

1. A detachable ultraviolet (UV) protector shield device, comprising:

a housing, comprising:
  a front face rim;
  a backplate, wherein the backplate is spaced a distance apart from the front face rim, and wherein an outer periphery of the backplate is greater than the outer periphery of the front face rim;
  a top wall extending perpendicular outward from a front portion of the backplate;
  a first side wall and a second side wall, wherein the first side wall is generally rectangular in shape and extends perpendicular downward from a first side edge of the top wall and the second side wall is generally rectangular in shape and extends perpendicular downward from a second opposing side edge of the top wall, and wherein the width of the top wall, first side wall, and second side wall are substantially the same;
  wherein the front face rim is formed around and is substantially flush with a front edge of the top wall, first side wall, and second side wall, and wherein the backplate is formed about a back edge of the top wall, first side wall, and second side wall;
  a uniformly flat UV protection panel attached to the front face rim, wherein a bottom edge of the uniformly flat UV protection panel is substantially flush with a bottom edge of the first sidewall and a bottom edge of the second sidewall; and
  an access opening spaced opposite and below the top wall, the access opening defined by the bottom edge of the uniformly flat UV protection panel, the bottom edge of the first sidewall, and the bottom edge of the second sidewall.

2. The device of claim 1, further comprising a releasable attachment mechanism disposed on at least a portion of the backplate, wherein the releasable attachment mechanism is configured to releasably couple to a surface.

3. The device of claim 2, wherein the releasable attachment mechanism comprising a releasable backing layer.

4. The device of claim 3, wherein the releasable backing layer comprise one or more of reusable adhesive, magnetic backing, and hook and loop.

5. The device of claim 2, wherein the releasable attachment mechanism comprises one or more releasable mechanical fasteners.

6. The device of claim 1, wherein the housing is generally U-shaped.

7. The device of claim 1, wherein the uniformly flat UV protection panel is configured to at least one of filter, block, or absorb UV light.

8. The device of claim 1, wherein the housing comprises a UV-resistant weatherable material.

9. The device of claim 8, wherein the UV-resistant weatherable material comprises Acrylonitrile Styrene Acrylate (ASA) plastic.

10. The device of claim 1, wherein the uniformly flat UV protection panel comprises glass with a UV protection coating.

11. The device of claim 1, wherein when installed the uniformly flat UV protection panel of the detachable UV protector shield device is configured to filter, block, or absorb UV light from striking a surface directly behind the uniformly flat UV protection panel.

12. The device of claim 1, wherein the housing comprises one of a generally square, diamond, triangular, circular, or ovular shape.

13. The device of claim 1, wherein the detachable UV protector shield device comprises an overall width in the range of about 7 inches to about 24 inches; an overall height in the range of about 5 inches to about 15 inches; an overall thickness in the range of about 2 inches to about 4 inches, and wherein the uniformly flat UV protection panel is in the range of about 4 inches to about 22 inches wide and in the range of about 3 inches to about 13 inches high.

14. The device of claim 1, wherein one or more of the top wall, the first side wall, and/or the second side wall are generally opaque.

15. A method of using a detachable UV protector shield device, the method comprising:
  providing a detachable UV protector shield device, comprising:
    a housing configured to at least partially cover a controller display, the housing comprising: a front face rim; a backplate, wherein an outer periphery of the backplate is greater than an outer periphery of the front face rim; a top wall extending perpendicular outward from a front portion of the backplate; a first side wall, and a second side wall, wherein the first side wall is generally rectangular in shape and extends perpendicular downward from a first side edge of the top wall and the second side wall is generally rectangular in shape and extends perpendicular downward from a second opposing side edge of the top wall, and wherein the width of the top wall, first side wall, and second side wall are substantially the same; wherein the front face rim is formed around and is substantially flush with a front edge of the top wall, first side wall, and second side wall, and wherein the backplate is formed about a back edge of the top wall, first side wall, and second side wall;
    a uniformly flat UV protection panel attached to the front face rim, wherein a bottom edge of the uniformly flat UV protection panel is substantially flush with a bottom edge of the first sidewall and a bottom edge of the second sidewall; and
    an access opening spaced opposite and below the top wall, the access opening defined by the bottom edge of the flat UV protection panel, the bottom edge of the first sidewall, and the bottom edge of the second sidewall;
  installing the detachable UV protector shield device such that the UV protection panel covers a desired portion of a device, hardware, and/or component to be protected;
  removing the detachable UV protector shield device from the desired portion of the device, hardware, and/or component being protected, as needed, during operation or use of the desired portion of the device, hardware, and/or component being protected; and
  reinstalling the detachable UV protector shield device such that the UV protection panel covers the desired portion of the device, hardware, and/or component to be protected.

16. The method of claim 15, wherein the detachable UV protector shield device is installed and removed via one or more releasing mechanisms on the backplate.

17. The method of claim 16, wherein the one or more releasing mechanisms comprise one or more of reusable adhesive, magnetic backing, and hook and loop.

18. The method of claim 16, wherein the releasable attachment mechanism comprises one or more releasable mechanical fasteners.

19. The method of claim 15, wherein the desired portion of the device, hardware, and/or component to be protected comprises one or both of a display and/or controller of the device, hardware, and/or component.

20. The method of claim 15, wherein the uniformly flat UV protection panel is configured to at least one of filter, block, or absorb UV light from striking the desired portion of the device, hardware, and/or component to be protected.

* * * * *